United States Patent
Sakagami et al.

(10) Patent No.: US 6,214,416 B1
(45) Date of Patent: Apr. 10, 2001

(54) COATING COMPOSITION HAVING AT LEAST ONE UV RAY ABSORBING COMPONENT

(75) Inventors: Toshinori Sakagami, Suzuka; Mibuko Shimada, Yokkaichi, both of (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/236,638

(22) Filed: Jan. 26, 1999

(30) Foreign Application Priority Data

Jan. 27, 1998 (JP) .................................................. 10-027839

(51) Int. Cl.$^7$ ....................................................... B05D 3/02
(52) U.S. Cl. .............................. 427/387; 528/39; 528/30; 528/32; 524/432; 524/431; 524/91; 524/81; 556/27; 556/51; 556/81; 560/126
(58) Field of Search ................................ 427/387; 528/39, 528/30, 32; 524/432, 431, 91, 81; 556/27, 81; 560/126

(56) References Cited

U.S. PATENT DOCUMENTS

| | | |
|---|---|---|
| 4,103,065 | 7/1978 | Gagnon ............................. 428/336 |
| 4,374,674 | 2/1983 | Ashby et al. . |
| 4,456,647 | 6/1984 | Schönfelder et al. . |
| 4,863,520 | 9/1989 | Factor et al. . |
| 5,306,759 | 4/1994 | Sakagami et al. . |

FOREIGN PATENT DOCUMENTS

WO 93/04131   3/1993   (WO) .

OTHER PUBLICATIONS

Database WPI, Derwent Publications, AN 85–162209, JP 60–092351, May 23, 1985.

*Primary Examiner*—Robert Dawson
*Assistant Examiner*—Kuo-Liang Peng
(74) *Attorney, Agent, or Firm*—Oblon, Spivak, McClelland, Maier & Neustadt, P.C.

(57) ABSTRACT

A coating composition comprising (A) a hydrolyzate or partial condensate, or both, of an organosilane compound represented by the following formula (1), $$(R^1)_n Si(OR^2)_{4-n} \qquad (1)$$

wherein $R^1$ is a hydrogen atom or a monovalent organic group having 1–8 carbon atoms, $R^2$ is an alkyl group having 1–5 carbon atoms or an acyl group having 1–6 carbon atoms, and n is an integer from 0 to 2, (B) at least one ultraviolet ray absorbing component selected from the group consisting of fine semiconductor particles, semiconductor sols, and organic compounds having ultraviolet ray absorbing capability, and (C1) water and/or an organic solvent. The coating composition exhibits excellent storage stability and produces coating films with good appearance, superior adhesion properties, weather resistance, high hardness, and superb UV absorbing capability.

9 Claims, No Drawings

COATING COMPOSITION HAVING AT LEAST ONE UV RAY ABSORBING COMPONENT

BACKGROUND OF THE INVENTION

1. Field of the Invention

The present invention relates to a coating composition and, more particularly, to an organosilane-based coating composition comprising a semiconductor component which possesses ultraviolet ray absorbing capability.

2. Description of the Background Art

Organosilane-based coating materials not only have excellent weather resistance, light resistance, and stain resistance, but also exhibit superior heat resistance, alkali resistance, solvent resistance, humidity resistance, water resistance, insulation resistance, abrasion resistance, soil resistance, good hardness, and mar resistance.

Demand for coating materials exhibiting long-term durability, particularly those used for protection of substrates and bases, has increased in recent years. The above-mentioned organosilane-based coating materials have excellent weather resistance. These coating materials are stable due to their incapability of absorbing ultraviolet rays. However, because these coating materials transmit ultraviolet rays, the substrates and bases on which these coating materials are coated deteriorate easily. The coating may delaminate or produce cracks. UV absorbers have conventionally been used to overcome this problem. However, UV absorbers have problems such as coloration of the coating materials, lack of affinity with resins, inadequate film-forming capability, lack of transparency, and the like. In addition, if added in a large amount, the UV absorbers may bleed out on the surface of the coating film, thereby impairing the film properties.

The present invention has been completed in view of these problems in the conventional technologies. Accordingly, an object of the present invention is to provide a coating composition which exhibits excellent storage stability and produces coating films with good appearance, superior adhesion properties, weather resistance, high hardness, and superb UV absorbing capability, and is therefore capable of preventing deterioration of substrates and bases.

The present inventors have conducted extensive studies and found that a coating composition with desired characteristics can be obtained by using a specific organosilane component and a semiconductor component which possesses UV ray absorbing capability.

SUMMARY OF THE INVENTION

Specifically, the present invention provides compositions for coatings defined in (1)–(9) below and their cured products.

(1) A coating composition (hereinafter called from time to time "first composition") which comprises:

(A) a hydrolyzate or partial condensate, or both, of an organosilane compound represented by the following formula (1), $$(R^1)_n Si(OR^2)_{4-n} \tag{1}$$

wherein $R^1$ is a hydrogen atom or a monovalent organic group having 1–8 carbon atoms, $R^2$ is an alkyl group having 1–5 carbon atoms or an acyl group having 1–6 carbon atoms, and n is an integer from 0 to 2, (B) at least one ultraviolet ray absorbing component selected from the group consisting of fine semiconductor particles, semiconductor sols, and organic compounds having ultraviolet ray absorbing capability, and (C1) water and/or an organic solvent.

(2) A coating composition further comprising, in addition to the components (A), (B), and (C1), (D) at least one curing accelerator selected from the group consisting of acid compounds, alkaline compounds, salt compounds, amine compounds, organometallic compounds, and partial hydrolyzates of the organometallic compounds.

(3) A coating composition according to (2) above, wherein the component (D) is an organometallic compound of the following formula (2), $$M(OR^{10})_p(R^{11}COCHCOR^{12})_q \tag{2}$$

wherein M is zirconium, titanium, or aluminum, $R^{10}$ and $R^{11}$ individually represent a monovalent hydrocarbon group having 1–6 carbon atoms, such as an ethyl group, n-propyl group, i-propyl group, n-butyl group, sec-butyl group, t-butyl group, n-pentyl group, n-hexyl group, cyclohexyl group, or phenyl group, $R^{12}$ represents, in addition to the monovalent hydrocarbon groups having 1–6 carbon atoms defined for $R^{10}$ and $R^{11}$, an alkoxyl group having 1–16 carbon atoms such as a methoxy group, ethoxy group, n-propoxy group, i-propoxy group, n-butoxy group, sec-butoxy group, t-butoxy group, lauryloxy group, or stearyloxy group, and p and q are individually integers from 0 to 4, with (p+q) being a valence of M, and further comprising, (E) at least one compound selected from the group consisting of β-diketone compounds of the following formula (3), $$R^{13}COCH_2COR^{14} \tag{3}$$

wherein $R^{13}$ and $R^{14}$ are the same as $R^{11}$ and $R^{12}$ defined for the above formula (2), β-keto esters, carboxylic acid compounds, dihydroxy compounds, amine compounds, and oxyaldehyde compounds.

(4) A coating composition (hereinafter called from time to time "second composition") which comprises:

(A) a hydrolyzate or partial condensate, or both, of an organosilane compound represented by the following formula (1), $$(R^1)_n Si(OR^2)_{4-n} \tag{1}$$

wherein $R^1$ is a hydrogen atom or a monovalent organic group having 1–8 carbon atoms, $R^2$ is an alkyl group having 1–5 carbon atoms or an acyl group having 1–6 carbon atoms, and n is an integer from 0 to 2, (B) at least one ultraviolet ray absorbing component selected from the group consisting of semiconductor fine particles, semiconductor sols, and organic compounds having ultraviolet ray absorbing capabilities, and (C2) a polymer having a silyl group of which the silicon atom is bonded with a hydrolyzable group and/or a hydroxyl group on the terminal and/or side chain of the polymer molecule.

(5) A coating composition further comprising, in addition to the components (A), (B), and (C2), (D) at least one curing accelerator selected from the group consisting of acid compounds, alkaline compounds, salt compounds, amine compounds, and organometallic compounds, and partial hydrolyzates of the organometallic compounds.

(6) A coating composition according to (5) above, wherein the component (D) is an organometallic compound of the following formula (2), $$M(OR^{10})_p(R^{11}COCHCOR^{12})_q \quad (2)$$

wherein M is zirconium, titanium, or aluminum, $R^{10}$ and $R^{11}$ individually represent a monovalent hydrocarbon group having 1–6 carbon atoms, such as ethyl group, n-propyl group, i-propyl group, n-butyl group, sec-butyl group, t-butyl group, n-pentyl group, n-hexyl group, cyclohexyl group, or phenyl group, $R^{12}$ represents, in addition to the monovalent hydrocarbon groups having 1–6 carbon atoms defined for $R^{10}$ and $R^{11}$, an alkoxyl group having 1–16 carbon atoms such as methoxy group, ethoxy group, n-propoxy group, i-propoxy group, n-butoxy group, sec-butoxy group, t-butoxy group, lauryloxy group, or stearyloxy group, and p and q are individually an integer of 0–4, with (p+q) being the valence of M, and further comprising, (E) at least one compound selected from the group consisting of β-diketone compounds of the following formula (3), $$R^{13}COCH_2COR^{14} \quad (3)$$

wherein $R^{13}$ and R14 are the same as $R^{11}$ and $R^{12}$ defined for the above formula (2), β-keto esters, carboxylic acid compounds, dihydroxy compounds, amine compounds, and oxyaldehyde compounds.

(7) A coating composition according to (4) above, wherein the ultraviolet ray absorbing component (B) forms a condensate with the polymer of the component (C2).

(8) A cured product produced by applying the coating composition of (1) or (4) above onto a substrate and drying the coating.

(9) A cured product produced by applying a primer on a substrate, applying the coating composition of (1) or (4) above on the primer, and drying the coating.

Other objects, features and advantages of the invention will hereinafter become more readily apparent from the following description.

DETAILED DESCRIPTION OF THE INVENTION AND PREFERRED EMBODIMENTS

The components for the composition of the present invention will be described in detail.

Component (A)

The component (A) in the composition of the present invention is a hydrolyzate and/or partial condensate of the organosilane of the above-mentioned formula (1). This component acts as a major binder in the composition of the present invention.

Given as examples of the mono-valent organic group having 1–8 carbon atoms represented by $R^1$ in the formula (1) are alkyl groups such as a methyl group, ethyl group, n-propyl group, i-propyl group, n-butyl group, sec-butyl group, t-butyl group, n-hexyl group, n-heptyl group, n-octyl group, and 2-ethylhexyl group; vinyl group, allyl group, cyclohexyl group, phenyl radical, acyl group, glycidyl group,(meth)acryloxy group, ureido group, amide group, fluoro acetamide group, and isocyanate group, as well as substitution derivatives of these groups.

As examples of the substituent for the substitution derivatives of $R^1$, halogen atoms, substituted or unsubstituted amino groups, a hydroxyl group, mercapto group, isocyanate group, glycidoxy group, 3,4-epoxycyclohexyl group, (meth)acryloxy group, ureido group, ammonium group, and the like can be given. The total number of carbon atoms present in the group $R^1$, including the carbon atoms in the substituents, should be 8 or less.

When a plurality of groups $R^1$ is present in the formula (1), such groups may be either the same or different.

As examples of the alkyl group having 1–5 carbon atoms represented by $R^2$ in the formula (1), a methyl group, ethyl group, n-propyl group, i-propyl group, n-butyl group, sec-butyl group, t-butyl group, n-pentyl group, and the like can be given. As examples of the acyl group having 1–6 carbon atoms represented by $R^2$ in the formula (1), an acetyl group, propionyl group, butyryl group, valeryl group, caproyl group, and the like can be given.

When a plurality of groups $R^2$ is present in the formula (1), such groups may be either the same or different.

n in the formula (1) is an integer from 0 to 2. The compound of the formula (1) with n of 3 or more is unsuitable as the component (A) of the present invention, because such a compound cannot polymerize.

Here, given as specific examples of the organosilane compounds for the component (A) with n=0 in the formula (1) are tetramethoxysilane, tetraethoxysilane, tetra-n-propoxysilane, tetra-i-propoxysilane, tetra-n-butoxysilane, tetraacetyloxysilane, tetraphenoxysilane, and the like.

These organosilane compounds may be used either individually or in combinations of two or more.

The following compounds can be given as specific examples of organosilane compounds with n=in the formula (1):

trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-pentyltriethoxysilane, cyclohexyltrimethoxysilane, cyclohexyltriethoxysilane, phenyltrimethoxysilane, phenyltriethoxysilane,
N-(2-aminoethyl)-3-aminopropyltrimethoxysilane,
N-(2-aminoethyl)-3-aminopropyltriethoxysilane,
3-glycidoxypropyltrimethoxysilane,
3-glycidoxypropyltriethoxysilane,
2-(3,4-epoxycyclohexyl)ethyltrimethoxysilane,
2-(3,4-epoxycyclohexyl)ethyltriethoxysilane,
3-(meth)acryloxypropyltrimethoxysilane,
3-(meth)acryloxypropyltriethoxysilane,
vinyltrimethoxysilane, vinyltriethoxysilane,
allyltrimethoxysilane, vinyltriacetoxysilane,
3-chloropropyltrimethoxysilane,
3-chloropropyltriethoxysilane,
3-trifluoropropyltrimethoxysilane,
3,3,3-trifluoropropyltriethoxysilane,
3-aminopropyltrimethoxysilane,
3-aminopropyltriethoxysilane,
2-hydroxyethyltrimethoxysilane,
2-hydroxyethyltriethoxysilane,
2-hydroxypropyltrimethoxysilane,
2-hydroxypropyltriethoxysilane,
3-hydroxypropyltrimethoxysilane,
3-hydroxypropyltriethoxysilane,
3-mercaptopropyltrimethoxysilane,
3-mercaptopropyltriethoxysilane,
3-isocyanatepropyltrimethoxysilane,
3-isocyanatepropyltriethoxysilane,
3-ureidopropyltrimethoxysilane, and
3-ureidopropyltriethoxysilane, as well as other organosilane compounds such as methylthoriumoxidecetyloxy silane, methyltriphenoxysilane, and the like.

Of these organosilane compounds, trialkoxysilanes are preferred, with methyltrimethoxysilane, methyltriethoxysilane, ethyltrimethoxysilane, and ethyltriethoxysilane being particularly preferred.

These organosilane compounds with n=1 in the formula (1) may be used either individually or in combinations of two or more.

Furthermore, given as specific examples of the organosilane compounds with n=2 in the formula (1) are dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, n-pentylmethyldimethoxysilane, n-pentylmethyldiethoxysilane, cyclohexylmethyldimethoxysilane, cyclohexylmethyldiethoxysilane, phenylmethyldimethoxysilane, phenylmethyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, dicyclohexyldimethoxysilane, dicyclohexyldiethoxysilane, diphenyldimethoxysilane, and diphenyldiethoxysilane, as well as dimethyldiacetyloxysilane, dimethyldiphenoxysilane, and the like.

These organosilane compounds with n=2 in the formula (1) may be used either individually or in combinations of two or more.

The organosilane compounds may be previously hydrolyzed or condensed before being used as the component (A). More preferably, an appropriate amount of water may be added as the component (C1) when the organosilane compound is mixed with the other components during preparation of the composition, whereby the organosilane is hydrolyzed or condensed to be used as the component (A).

When the component (A) is used as a partial condensate, the polystyrene-standadized weight average molecular weight (hereinafter abbreviated as "Mw") of this partial condensate is in a range from 800 to 100,000, and preferably from 1,000 to 50,000. The Mw of apartial condensate used as the component (A) is appropriately selected according to the film-forming capability of the composition, hardness or flexibility of the coating film, and the like.

As commercially available products of the component (A) which can be used in the present invention, MKC Silicate™ manufactured by Mitsubishi Chemical Corp., silicate manufactured by Korucoat Chemical Co., Ltd., silicone resin manufactured by Toray-Dow Corning Co., silicone resin manufactured by Toshiba Silicone Co., Ltd., silicone oligomer manufactured by Japan Unica Co., Ltd., and the like can be given.

The component (A) may be used either individually or in combinations of two or more in the composition of the present invention.

Component (B)

The component (B) is at least one ultraviolet ray absorbing component selected from the group consisting of fine semiconductor particles, semiconductor sols, and organic compounds having ultraviolet ray absorbing capabilities. Of these, the semiconductor fine particles and semiconductor sols having ultraviolet ray absorbing capabilities are referred to from time to time in this specification as "(B1) inorganic ultraviolet ray absorbing components" and the organic compounds having ultraviolet ray absorbing capabilities are referred to from time to time as "(B2) organic ultraviolet ray absorbing components".

In the composition of the present invention, the ultraviolet ray absorbing capability of the component (B) ensures coatings with superior UV radiation absorptivity without substantially impairing the coating performance, whereby deterioration due to ultraviolet radiation of substrates or bases coated with the composition can be effectively prevented.

As examples of a semiconductor having ultraviolet ray absorption capabilities which is the inorganic ultraviolet ray absorbing component (Bi), rutile crystals of $TiO_2$, ZnO, $CeO_2$, and the like can be given, with the preferred component (B1) being rutile crystals ZnO.

There are three types of forms for the component (B1), i.e. a powder consisting of fine particles, an aqueous type sol with fine particles dispersed in water, and a solvent sol with fine particles dispersed in a polar solvent such as isopropyl alcohol or a non-polar solvent such as toluene. The solvent sol may be used by diluting with water or a solvent according to the dispersibility of the fine semiconductor particles.

The smaller the average particle diameter of these semiconductor fine particles in these forms of the component (B1), the better the ultraviolet radiation absorption capability. Specifically, the average particle size is preferably 1 $\mu$m or less, more preferably 0.5 $\mu$m or less, and even more preferably 0.1 $\mu$m or less. A UV absorber which has superior transparency and can be used semipermanently without deterioration can be obtained by finely pulverizing the component (B). A surfactant, dispersing agent, coupling agent, and the like may be added to these fine particles or sols to improve dispersibility and storage stability, or to decrease photocatalytic reactivity. Alternatively, the surface of the fine particles or sols may be treated with such a surfactant, dispersing agent, or coupling agent.

When the component (B1) is an aqueous sol or solvent sol, the solid component concentration in the sol is preferably 60 wt % or less, and more preferably 50 wt % or less.

The component (B1) may be added to the composition of the present invention after the preparation of a mixture comprising the above-mentioned component (A) and the component (C1) or a mixture comprising the above-mentioned component (A) and a later-described component (C2) or, alternatively, may be added when the composition of the present invention is prepared, in which case the organosilane compound of the component (A) is hydrolyzed or condensed in the presence of the component (B1). The addition of the component (B1) during the preparation of the composition enables the semi-conductor compounds in the component (B1) to condense together with the component (A) and the other components, ensuring excellent dispersion of the component (B1) in the composition. The component (B1) in the form of an aqueous sol is also added preferably during the preparation of the composition. The addition of the component (B1) during the preparation of the composition is also desirable when the viscosity is increased by the addition of the later described component (F).

As commercially available products of the component (B1) which can be used in the present invention, Taipaque TTO manufactured by Ishihara Industry Co., Ltd., ZW-143, ZW-513C, ZS-300, ZS-303, ZnO-100, and ZnO-200 manufactured by Sumitomo Osaka Cement Co., Ltd., Z-NOUVE manufactured by Mitsui Mining & Smelting Co., Ltd., Needral manufactured by Taki Chemical Co., Ltd., and CERIGUARD and Highsera Super K29 manufactured by Japan Inorganic colour & chemical Co., Ltd. can be given.

The component (B1) may be used either individually or in combinations of two or more in the composition of the present invention.

The amount of the component (B1) as a solid base used in the composition of the present invention is in a range usually from 0.1 to 500 parts by weight, and preferably from 0.5 to 200 parts by weight, for 100 parts by weight of the component (A) (organosilane base) for the first composition, and from 1 to 1,000 parts by weight, and preferably from 2 to 600 parts by weight, for 100 parts by weight of the component (A) (organosilane base) for the second composition.

If the amount of the component (B1) in the composition of the present invention is too small, sufficient ultraviolet ray absorbing capability cannot be obtained, failing to achieve the object of the present invention; if too large, on the other hand, the film-forming capability of the resulting coating material is inferior, so that breaking and delamination of coatings may occur.

The organic ultraviolet ray absorbing component (B2) is an organic compound having a ultraviolet ray absorbing capability. It is desirable that such compounds used as the component (B2) be soluble in organic solvents such as alcohols.

Given as specific examples of an organic ultraviolet ray absorbing component are:
salicylic acid-type UV absorbers such as phenyl salicylate, p-t-butylphenyl salicylate, and p-octylphenyl salicylate;
benzophenone-type UV absorbers such as
2,4-dihydroxybenzophenone,
2-hydroxy-4-methoxybenzophenone,
2-hydroxy-4-octoxybenzophenone,
2-hydroxy-4-dodecyloxybenzophenone,
2,2'-dihydroxy-4-methoxybenzophenone,
2,2'-dihydroxy-4,4'-dimethoxybenzophenone,
bis(2-methoxy-4-hydroxy-5-benzoylphenyl)methane, and
2,2'4,4'-tetrahydroxybenzophenone;
benzotriazole-type UV absorbers such as
2-(2'-hydroxy-5'-methylphenyl)benzotriazole,
2-(2'-hydroxy-5'-t-butylphenyl)benzotriazole,
2-)2'-hydroxy-3', 5'-di-t-butylphenyl)benzotriazole,
2-(2-hydroxy-3'-t-butyl-5'-methylphenyl)-5-chlorobenzotriazole,
2-(2'-hydroxy-3', 5'-di-t-butylphenyl)-5-chlorobenzotriazole,
2-(2'-hydroxy-3', 5'-di-t-amylphenyl)benzotriazole,
2-{2'-hydroxy-3",(3",4',5",6"-tetrahydrophthalimide-methyl)-5'-methylphenyl}benzotriazole,
2,2'-methylenebis{4-(1,1,3,3-tetramethylbutyl)-6-(2H-benzotriazol-2-yl)phenyl}, and
2-(2'-hydroxy-5 '-octylpropionate)benzotriazole;
cyanoacrylate-type UV absorbers such as 2-ethylhexyl-2-cyano-3,3'-diphenyl acrylate and ethyl-2-cyano-3,3'-diphenyl acrylate; and triazine-type UV absorbers such as 2-hydroxyphenylbenzotriazine.

Of these UV absorbers, the salicylic acid-type, benzophenone-type, and triazine-type UV absorbers which can efficiently absorb ultraviolet rays having a wavelength of 320 nm or less (UV-B) are desirable.

The above UV absorbers may be used as the component (B2) either individually or in combinations of two or more in the composition of the present invention. In addition, the component (B2) can be used mixed with the component (B1). A mixture of a compound of the component (B2) which efficiently absorbs the UV-B and a compound of the component (B2) which efficiently absorbs the ultraviolet rays with a wavelength larger than 320 nm (UV-A) is particularly preferred. Given as UV absorbers of the component (B2) which efficiently absorb UV-A are benzotriazole-type UV absorbers and cyano acrylate-type UV absorbers.

The component (B2) can be added to the composition of the present invention in the same manner as the above-described method of adding the component (B1). In addition, it is possible to use a monomer having ultraviolet ray absorbing capability as the component (B2) and cause such a monomer to condense together with the component (C2) which is the other essential component in the composition of the present invention.

Given as examples of such a monomer used as the component (B2) are benzophenone compounds such as
2-(meth)acryloyloxy-4-methoxybenzophenone,
2-(meth)acryloyloxy-2'-hydroxy-4-methoxybenzophenone,
2,2'-di(meth)acryloyloxy-4-methoxybenzophenone,
2,2'-di(meth)acryloyloxy-4,4'-dimethoxybenzophenone,
2-(meth)acryloyloxy-4-methoxy-2'-carboxybenzophenone,
2-hydroxy-4-[3-(meth)acryloyloxy-2-hydroxypropoxy] benzophenone, and
2,21-dihydroxy-4-[3-(meth)acryloyloxy-2-hydroxypropoxy]benzophenone; benzotriazole compounds such as
2-[2'-(meth)acryloyloxy-5'-methylphenyl]benzotriazole,
2-[2'-(meth)acryloyloxy-5'-t-octylphenyl]benzotriazole,
2-[2'-(meth)acryloyloxy-3', 5'-di-t-butylphenyl] benzotriazole,
2-ethylhexyl-2-cyano-3,3-diphenyl(meth)acrylate,
1,3-bis(4-benzoyl-3-hydroxyphenoxy)-2-propyl (meth) acrylate, and ethyl-2-cyano-3,3-diphenyl (meth)acrylate.

These monomers may be used either individually or in combinations of two or more.

The amount of the components (B2) in the composition of the present invention is in a range usually from 0.1 to 10 parts by weight, and preferably from 0.5 to 8 parts by weight, for 100 parts by weight of the component (A). If the amount of the component (B2) is less than 0.1 part by weight, the ultraviolet ray absorbing capability of the resulting coatings may be insufficient; if more than 10 parts by weight, on the other hand, the weather resistance of the resulting coating films may be poor.

Component (C-1)

The component (C-1) in the first composition is water and/or an organic solvent.

The first composition comprises the above-described component (A) and component (B) as essential components, and further contains later-described components (D) to (F) as required. When the composition is prepared, water is added to hydrolyze or partially condense the organosilane compound or to disperse the particle components.

The amount of water added to the first composition is in the range usually from 0.5 to 3 mols, and preferably from 0.7 to 2 mols, for 1 mol of the the organosilane compound used as the component (A).

The second composition comprises the above-described component (A) and component (B), and a later-described component (C2), as essential components, and further contains later-described components (D) to (F) as required. When the composition is prepared, water is added to hydrolyze or partially condense the organosilane compound or component (C2), or to disperse the particle components.

The amount of water added to the second composition is in the range usually from 0.5 to 3 mols, and preferably from 0.7 to 2 mols, for 1 mol of the organosilane compound used as the component (A).

On the other hand, the organic solvent in the first composition is added to homogeneously mix the components (A) and (B), and the components (D)–(F) which are used as optional components, to adjust the total solid concentration of the composition to make the composition applicable to various coating methods, and to improve dispersion stability and storage stability of the composition.

Although there are no specific limitations to the types of the organic solvent inasmuch as such a solvent can homogeneously mix the above-mentioned components, one or more solvents selected from alcohols, aromatic hydrocarbons, ethers, ketones, and esters can be used. As specific examples of alcohols among these organic solvents, methanol, ethanol, n-propyl alcohol, i-propyl alcohol, n-butyl alcohol, sec-butyl alcohol, t-butyl alcohol, n-hexyl alcohol, n-octyl alcohol, ethylene glycol, diethylene glycol, triethylene glycol, ethylene glycol monobutyl ether, ethylene glycol monoethyl ether acetate, and the like can be given.

As specific examples of aromatic hydrocarbons, benzene, toluene, xylene, and the like can be given. As specific examples of ethers, tetrahydrofuran, dioxane, and the like can be given. As specific examples of ketones, acetone, methyl ethyl ketone, methyl isobutyl ketone, diisobutyl ketone, and the like can be given. As specific examples of esters, ethyl acetate, propyl acetate, butyl acetate, propylene carbonate, and the like can be given.

The total solid concentration of the first composition is preferably 50 wt % or less and is suitably adjusted according to the application. For example, when the composition is used for impregnation into a thin film forming substrate, the solid concentration is usually from 5 to 30 wt %. When used to prepare a thick film, the solid concentration is usually from 10 to 50 wt %, and preferably from 20 to 40 wt %. If the total solid concentration of the composition exceeds 50 wt %, the storage stability tends to be impaired.

An organic solvent is also used in the second composition to homogeneously mix the major components (A), (B), and (C2), as well as the optional components (D)–(F), to adjust the total solid concentration of the composition to make the composition applicable to various coating methods, and to improve dispersion stability and storage stability of the composition.

The total solid concentration of the second composition is preferably 50 wt % or less and is suitably adjusted according to the application. For example, when the composition is used for impregnation into a thin film forming substrate, the solid concentration is usually from5 to 30 wt %. When used to prepare a thick film, the solid concentration is usually from 10 to 50 wt %, and preferably from 20 to 40 wt %. If the total solid concentration of the composition exceeds 50 wt %, the storage stability tends to be impaired.

The component (C2) is a polymer having a silyl group of which the silicon atom is bonded with a hydrolyzable group and/or a hydroxyl group on the terminal and/or side chain of the polymer molecule (such a silyl group hereinafter may be called "specific silyl group").

When the coating film produced from the second invention is cured, the hydrolyzable group or hydroxyl group in the component (C2) condenses together (co-condense) with the above-mentioned component (A) and component (B), thereby improving the coating performance.

The amount of the specific silyl group in the component (C2), in terms of the amount of silicon atoms, is in the range usually from 0.001 to 20 wt % of the weight of the polymer before introduction of the specific silyl group.

The specific silyl group is a group shown by the following formula (2).

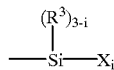

(2)

wherein X is a hydroxyl group or a hydrolyzable group such as a halogen atom, alkoxy group, acyloxy group, aminoxy group, phenoxy group, thioalkoxy group, or amino group, $R^3$ indicates a hydrogen atom, an alkyl group having 1–10 carbon atoms, or an aralkyl group having 1–10 carbon atoms, and i is an integer from 1 to 3.

The component (C2) can be prepared, for example, according to the following methods.

(a) A method of reacting a hydrosilane compound (hereinafter called a "hydrosilane compound (a)") and a vinyl polymer having a carbon-carbon double bond (hereinafter called an "unsaturated vinyl polymer") to add the hydrosilane compound to the carbon-carbon double bond of the unsaturated vinyl polymer.

(b) A method of reacting a silane compound (hereinafter called an "unsaturated silane compound (b)") of the following formula (3),

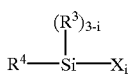

(3)

wherein X, $R^3$, and i are the same as defined in the above formula (2) and $R^4$ represents an organic group having a polymerizable double bond, with other vinyl-type monomer.

Given as examples of the hydrosilane compound (a) used in the above-mentioned method (a) are a halogenated silane such as a methyldichlorosilane, trichlorosilane, and phenyldichlorosilane; an alkoxysilane such as a methyldiethoxysilane, methyldimethoxysilane, phenyldimethoxysilane, trimethoxysilane, and triethoxysilane; an acyloxysilanes such as a methyldiacetoxy silane, phenyldiacetoxysilane, and triacetoxysilane; and an aminoxysilanes such as a methyldiaminoxysilane, triaminoxysilane, dimethylaminoxysilane, and the like.

These hydrosilane compounds (a) can be used either individually or in combinations of two or more.

There are no specific limitations to the unsaturated vinyl polymers used in the above-mentioned method (a) inasmuch as such a polymer does not have a hydroxyl group. For example, such a polymer can be prepared by the following processes (a-1) or (a-2), or a combination of these processes.
Process (a-1):
A process comprising polymerizing a vinyl monomer having a functional group (hereinafter called "functional group (α)") to obtain a (co) polymer, and reacting the functional group (α) in this (co)polymer with an unsaturated compound having a functional group (hereinafter called "functional group (β)") which can react with the functional group (α) and a carbon-carbon double bond, thereby obtaining an unsaturated vinyl polymer having a carbon-carbon double bond on the side chain of the polymer molecule chain. Process (a-2):
A process comprising (co)polymerizing a vinyl monomer using a radical polymerization initiator having a functional group (α) (for example, 4,4-azobis-4-cyanovaleric acid) or using a radical polymerization initiator and a chain transfer agent both having a functional group (α) (for example, 4,4-azobis-4-cyanovaleric acid and dithioglycolic acid) to synthesize a (co)polymer having a functional group (α) originating from the radical polymerization initiator and a chain transfer agent on one or both terminals of the polymer chain, and reacting an unsaturated compound having a functional group (β) and a carbon-carbon double bond with the functional group (α), thereby obtaining an unsaturated vinyl polymer which possesses a carbon-carbon double bond on one or both terminals of the polymer chain.

As examples of the reaction between the functional groups (α) and (β) in the above processes (a-1) and (a-2), an esterification reaction of a carboxyl group and a hydroxyl group, a ring-opening esterification reaction of a carboxylic acid anhydride group and a hydroxyl group, an esterification reaction of a carboxyl group and an epoxy group, an amidation reaction of a carboxyl group and an amino group, a ring-opening amidation reaction of a carboxylic acid anhydride group and an amino group, a ring-opening addition reaction of an epoxy group and an amino group, and urethanization reaction of a hydroxyl group and an isocyanate group, as well as a combination of these reactions, can be given.

Given as examples of the vinyl monomers having a functional group (α) are an unsaturated carboxylic acid such as a (meth) acrylic acid, crotonic acid, maleic acid, fumaric acid, and itaconic acid; a unsaturated carboxylic acid anhydride such as a maleic acid anhydride and itaconic acid anhydrise; a hydroxyl group-containing vinyl monomers such as a 2-hydroxyethyl (meth)acrylate, 2-hydroxypropyl (meth)acrylate, 3-hydroxypropyl (meth)acrylate, N-methylol(meth)acrylamide, and 2-hydroxyethyl vinyl ether; an amino group-containing vinyl monomers such as a 2-aminoethyl (meth)acrylate, 2-aminopropyl (meth) acrylate, 3-aminopropyl (meth)acrylate, 2-dimethylaminoethyl (meth)acrylate, 2-diethylaminoethyl (meth)acrylate, 2-dimethylaminopropyl (meth) acrylate, 3-dimethylaminopropyl (meth)acrylate, 2-aminoethyl vinyl ether, N,N-dimethylamino (meth)acrylamide, and N,N-diethylamino (meth)acrylamide; an amine-imide group-containing vinyl monomers such as a 1,1,1-trimethylamine (meth)acrylimide, 1-methyl-1-ethylamine (meth)acrylimide, 1,1-dimethyl-1-(2-hydroxypropyl)amine (meth)acrylimide, 1,1-dimethyl-1-(2'-phenyl-2'-hydroxyethyl)amine (meth) acrylimide, 1,1-dimethyl-1-(2'-hydroxy-2'-phenoxypropyl) amine (meth)acrylimide; and an epoxy group-containing vinyl monomer such as a glycidyl (meth)acrylate and allyl glycidyl ether.

These vinyl monomers having a functional group (α) can be used either individually or in combinations of two or more.

As examples of other vinyl monomers to be copolymerized with the vinyl monomers having the functional group (α), methyl (meth)acrylate, ethyl (meth)acrylate, n-propyl (meth)acrylate, i-propyl (meth)acrylate, n-butyl (meth) acrylate, t-butyl (meth)acrylate, 2-ethylhexyl (meth) acrylate, cyclohexyl (meth)acrylate, (meth)acrylamide, crotonamide, maleic acid diamide, fumaric acid diamide, itaconic acid diamide, α-ethyl acrylamide, N-butoxy methyl (meth)acrylamide, (meth)acrylonitrile, styrene, α-methylstyrene, vinyl chloride, vinyl acetate, vinyl propionate, and the like can be given.

These other vinyl monomers can be used either individually or in combinations of two or more.

As the unsaturated compound having a functional group (β) and a carbon-carbon double bond, in addition to the same vinyl monomers as given above as the vinyl monomers having functional group (α), an isocyanate group-containing unsaturated compound obtained by reacting one mol of the above-mentioned hydroxyl group-containing vinyl monomer and one mol of a diisocyanate compound, and the like can be given.

The following compounds can be given as as specific examples of the unsaturated silane compounds (b) which is used in the above-mentioned method (b).

$CH_2=CHSi(CH_3)(OCH_3)_2$
$CH_2=CHSi(OCH_3)_3$
$CH_2=CHSi(CH_3)Cl_2$
$CH_2=CHSiCl_3$
$CH_2=CHCOO(CH_2)_2Si(CH_3)(OCH_3)_2$
$CH_2=CHCOO(CH_2)_2Si(OCH_3)_3$
$CH_2=CHCOO(CH_2)_3Si(CH_3)(OCH_3)_2$
$CH_2=CHCOO(CH_2)_3Si(OCH_3)_3$
$CH_2=CHCOO(CH_2)_2Si(CH_3)Cl_2$
$CH_2=CHCOO(CH_2)_2SiCl_3$
$CH_2=CHCOO(CH_2)_3Si(CH_3)Cl_2$
$CH_2=CHCOO(CH_2)_3SiCl_3$
$CH_2=C(CH_3)COO(CH_2)_2Si(CH_3)(OCH_3)_2$
$CH_2=C(CH_3)COO(CH_2)_2Si(OCH_3)_3$
$CH_2=C(CH_3)COO(CH_2)_3Si(CH_3)(OCH_3)_2$
$CH_2=C(CH_3)COO(CH_2)_3Si(OCH_3)_3$
$CH_2=C(CH_3)COO(CH_2)_2Si(CH_3)Cl_2$
$CH_2=C(CH_3)COO(CH_2)_2SiCl_3$
$CH_2=C(CH_3)COO(CH_2)_3Si(CH_3)Cl_2$
$CH_2=C(CH_3)COO(CH_2)_3SiCl_3$

As other vinyl monomers used to copolymerize with the unsaturated silane compound (b), one or more vinyl monomers having a functional group (α) and other vinyl monomers described above in connection with the process (a-1) can be given.

As a specific preferable example of the component (C2) described above, a trialkoxysilyl group-containing (meth) acrylate copolymer of the following formula (4) can be given.

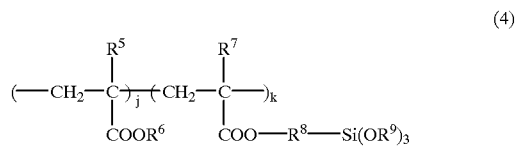

(4)

wherein $R^5$ is a hydrogen atom or a methyl group, $R^6$ is an alkyl group having 1–6 carbon atoms such as a methyl group, ethyl group, n-propyl group, i-propyl group, n-butyl group, i-butyl group, n-pentyl group, or n-hexyl group, $R^7$ is the same as $R^5$, $R^8$ is an alkylene group having 1–4 carbon atoms such as a methylene group, ethylene group, propylene group, or butylene group, $R^9$ is the same as $R^6$, and j and k are individaully values satisfying the equation $k/(j+k)=0.01–0.4$, and preferably $k/(j+k)=0.02–0.2$.

As examples of the other specific silyl group-containing compounds used as the component (C2), a specific silyl group-containing epoxy resin, specific silyl group-containing polyester resin, specific silyl group-containing fluororesin, and the like can be given.

A specific silyl group-containing epoxy resin can be prepared, for example, by reacting an epoxy group in an epoxy resin such as bisphenol A resin, bisphenol F epoxy resin, hydrogenated bisphenol A epoxy resin, aliphatic polyglycidyl ether, or aliphatic polyglycidyl ester, with an amino silane, vinyl silane, carboxy silane, or glycidyl silane having a specific silyl group.

A specific silyl group-containing fluorine resin can be prepared, for example, by reacting a carboxyl group or a hydroxyl group contained in a (co)polymer of fluorinated ethylene or the like with an amino silane, carboxy silane, or glycidyl silane having a specific silyl group.

A polystyrene-standardized number average molecular weight (Mn) of the component (C2) is preferably from 2,000 to 100,000, and more preferably from 4,000 to 50,000.

These compounds of the component (C2) can be used either individually or in combinations of two or more in the second composition.

The amount of component (C2) used in the second composition is usually from 2 to 900 parts by weight, preferably from 10 to 400 parts by weight, and more preferably from 20 to 200 parts by weight, for 100 parts by weight of the organosilane compound used as the component (A). If the amount of the component (C2) is less than 2 parts by weight, the alkali resistance of the resulting coating film tends to be impaired; if more than 900 parts by weight, on the other hand, the weather resistance of the coating film tends to be insufficient.

In addition to the above components, the following components (D)–(F) can be used in the first and second compositions of the present invention.

Component (D)

The component (D) is a catalyst which accelerates the hydrolysis-condensation reaction of the component (A) and the like. The use of the component (D) in the composition of the present invention accelerates the cure speed of the coatings produced from the composition and increases the molecular weight of the polysiloxane resin formed by the polycondensation reaction of the hydrolyzable organosilane component. This not only ensures production of coatings with excellent hardness, long-term durability, and the like, but also makes it easy to produce thick coatings. The coating work itself becomes easy.

An acid compound, alkaline compound, salt compound, amine compound, organometallic compound and its partial hydrolyzate (an organometallic compound and a partial hydrolyzate of the organometallic compound may be hereinafter collectively called "organometallic compounds") can be used as the component (D).

Acetic acid, hydrochloric acid, sulfuric acid, phosphoric acid, alkyl titanic acid, p-toluenesulfonic acid, phthalic acid, and the like are given as examples of the acid compound used as the component (D). Of these, acetic acid is preferred.

As an alkaline compound, sodium hydroxide, potassium hydroxide, and the like can be given as examples, with a preferred alkaline compound being sodium hydroxide.

As examples of a salt compound, alkali metal salts of an acid such as naphthenic acid, octyl acid, nitrous acid, sulfurous acid, aluminic acid, carbonic acid, or the like can be given.

Given as examples of an amine compound are ethylenediamine, hexamethylenediamine, diethylenetriamine, triethylenetetramine, tetraethylenepentamine, piperidine, piperazine, m-phenylenediamine, p-phenylenediamine, ethanolamine, triethylamine, 3-aminopropyltrimethoxysilane, 3-aminopropyltriethoxysilane, 3-(2-aminoethyl) aminopropyltrimethoxysilane, 3-(2-aminoethyl) aaminopropyltriethoxysilane, 3-(2-aminoethyl) aminopropylmethylenedimethoxysilane, 3-anilinopropyltrimethoxysilane, and the like; alkylamine salts; tert-ammonium salts; as well as various modified amines used as a curing agent for epoxy resins can be given. Of these salt compounds, 3-aminopropyl-trimethoxysilane, 3-aminopropyltriethoxysilane, and 3-(2-aminoethyl) aminopropyltriethoxysilane are particularly preferred.

A compound shown by the following formula (hereinafter may be called "organometallic compound (2)") can be given as an example of the organometallic compounds.

$$M(OR^{10})_p(R^{11}COCHCOR^{12})_q$$

wherein M is zirconium, titanium, or aluminum, $R^{10}$ and $R^{11}$ individually represent a monovalent hydrocarbon group having 1–6 carbon atoms, such as an ethyl group, n-propyl group, i-propyl group, n-butyl group, sec-butyl group, t-butyl group, n-pentyl group, n-hexyl group, cyclohexyl group, or phenyl group, $R^{12}$ represents, in addition to the monovalent hydrocarbon groups having 1–6 carbon atoms defined for $R^{10}$ and $R^{11}$, an alkoxyl group having 1–16 carbon atoms such as a methoxy group, ethoxy group, n-propoxy group, i-propoxy group, n-butoxy group, sec-butoxy group, t-butoxy group, lauryloxy group, or stearyloxy group, and p and q are individually integers from 0 to 4, with (p+q) being a valence of M.

A partial hydrolyzate of such an organometallic compound (2) can also be used. Other organometallic compounds used in the present invention are organotin compounds in which one or two alkyl groups having 1–10 carbon atoms are bonded to one tin atom with a valence of 4 (hereinafter may be called "organotin compounds") and partial hydrolyzates of the organotin compounds.

Given as specific examples of the organometallic compound (2) are organic zirconium compounds such as tetra-n-butoxy zirconium, tri-n-butoxyethylacetoacetate zirconium, di-n-butoxy-bis(ethylacetoacetate) zirconium, n-butoxy-tris(ethylacetoacetate) zirconium, tetrakis(n-propylacetoacetate) zirconium, tetrakis (acetylacetoacetate) zirconium, tri-n-butoxy-acetylacetonate zirconium, di-n-butoxy-bis(acetylacetonate) zirconium, n-butoxy-tris (acetylacetonate) zirconium, and tetrakis(ethylacetoacetate) zirconium; organic titanium compounds such as tetra-i-propoxy titanium, tetra-n-propoxy titanium, tri-i-propoxy (ethylacetoacetate) titanium, tri-i-propoxy(acetylacetonate) titanium, tri-n-propoxy(ethylacetoacetate) titanium, tri-n-propoxy(acetylacetate) titanium, i-propoxy-tris (ethylacetoacetate) titanium, di-i-propoxy-bis (ethylacetoacetate) titanium, di-i-propoxy-bis(acetylacetate) titanium, and di-i-propoxy-bis(acetylacetone) titanium; organic aluminum compound such as tri-i-propoxyaluminum, di-i-propoxyethylacetoacetate aluminum, di-i-propoxy-acetylacetonate aluminum, i-propoxy-bis(ethylacetoacetate) aluminum, i-propoxy-bis (acetylacetonate) aluminum, tris(ethylacetoacetate) aluminum, tris(acetylacetonate) aluminum, and monoacetylacetonate-bis(ethylacetoacetate) aluminum; and partial hydrolyzates of these compounds.

Of these, tri-n-butoxyethyl acetoacetate zirconium, di-i-propoxy-bis(acetylacetonate) titanium, di-i-propoxyethyl acetoacetate aluminum, tris (ethylacetoacetate) aluminum, and partial hydrolyzates of these compounds are desirable.

The following compounds are given as specific examples of organotin compounds.

(1) Carboxylic Acid Tin Compounds
$(C_4H_9)_2Sn(OCOC_{11}H_{23})_2$
$(C_4H_9)_2Sn(OCOCH=CHCOOCH_3)_2$
$(C_4H_9)_2\ Sn(OCOCH=CHCOOC_4\ H_9)_2$
$(C_8H_{17})_2Sn(OCOC_8H_{17})_2$
$(C_8H_{17})_2Sn(OCOC_{11}H_{23})_2$
$(C_8H_{17})_2Sn(OCOCH=CHCOOCH_3)_2$
$(C_8H_{17})_2Sn(OCOCH=CHCOOC_4H_9)_2$
$(C_8H_{17})_2Sn(OCOCH=CHCOOC_8H_{17})_2$
$(C_8H_{17})_2Sn(OCOCH=CHCOOC_{16}H_{33})_2$
$(C_8H_{17})_2Sn(OCOCH=CHCOOC_{17}H_{35})_2$ $(C_8H_{17})_2Sn(OCOCH=CHCOOC_{18}H_{37})_2$
$(C_8H_{17})_2Sn(OCOCH=CHCOOC_{20}H_{41})_2$

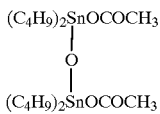

$(C_4H_9)Sn(OCOC_{11}H_{23})_3$
$(C_4H_9)Sn(OCONa)_3$
(2) Mercaptide-type Organotin Compounds
$(C_4H_9)_2Sn(SCH_2COOC_8H_{17})_2$
$(C_4H_9)_2Sn(SCH_2CH_2COOC_8H_{17})_2$
$(C_8H_{17})_2Sn(SCH_2COOC_8H_{17})_2$
$(C_8H_{17})_2Sn(SCH_2CH_2COOC_8H_{17})_2$
$(C_8H_{17})_2Sn(SCH_2COOC_{12}H_{25})_2$
$(C_8H_{17})_2Sn(SCH_2CH_2COOC_{12}H_{25})_2$
$(C_4H_9)_2Sn(SCOCH=CHCOOC_8H_{17})_3$
$(C_8H_{17})_2Sn(SCOCH=CHCOOC_8H_{17})_3$

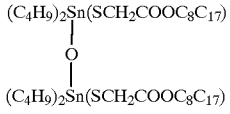

(3) Sulfide-type Organotin Compound;
$(C_4H_9)_2Sn=S$
$(C_8H_{17})_2Sn=S$

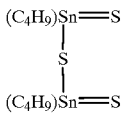

(4) Chloride-type Organotin Compounds
$(C_4H_9)SnCl_3$
$(C_4H_9)_2SnCl_2$
$(C_8H_{17})_2SnCl_2$

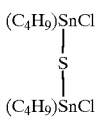

(5) Organotin Oxides
$(C_4H_9)_2SnO$
$(C_8H_{17})SnO$
(6) Reaction products of one of the above organotin oxides and an ester such as ethyl silicate, dimethyl maleate, diethyl maleate, or dioctyl phthalate.

The above-described compounds can be used either individually or in combinations of two or more in the composition of the present invention as the component (D). It is possible to use the component (D) mixed with a zinc compound or other reaction retarding agents.

The component (D) may added either when the composition is of the present invention prepared or when coatings are applied, or both of the time when the composition is prepared and when coatings are applied.

When the component (D) used in the composition of the present invention is a compound other than the organometallic compounds, the amount of the component (D) is usually from 0 to 100 parts by weight, preferably from 0.01 to 80 parts by weight, and even more preferably from 0.1 to 50 parts by weight, for 100 parts by weights of the total amount the organosilane compounds used as the above-mentioned component (A). When the component (D) used in the composition is an organometallic compound or the like, the amount of the component (D) is usually from 0 to 100 parts by weight, preferably from 0.1 to 80 parts by weight, and even more preferably from 0.5 to 50 parts by weight, for 100 parts by weights of the total amount the organosilane compounds used as the above-mentioned component (A). If the amount of the component (D) is more than 100 parts by weight for 100 parts by weights of the component (A), the storage stability of the resulting composition is impaired and coatings tends to produce cracks.

Component (E)

Component (E) is at least one compound selected from the group consisting of β-diketone compounds of the following formula (3), $$R^{13}COCH_2COR^{14} \qquad (3)$$

wherein $R^{13}$ and $R^{14}$ are the same as $R^{11}$ and $R^{12}$ defined for the above formula (2), β-keto esters, carboxylic acid compounds, dihydroxy compounds, amine compounds, and oxyaldehyde compounds. It is particularly desirable to use the component (E) together with the component (D) when an organometallic compound is used as the component (D).

The component (E) functions as a stability improver of the composition. Specifically, the component (E) conjugates on a metal atom of an organometallic compound or the like and functions to moderately control the action of the organometallic compound to accelerate the co-condensation reaction of the component (A) and component (B).

Given as specific examples of the component (E), are acetylacetone, methyl acetoacetate, ethyl acetoacetate, n-propyl acetoacetate, i-propyl acetoacetate, n-butyl acetoacetate, sec-butyl acetoacetate, t-butyl acetoacetate, hexane-2,4-dione, heptane-2,4-dione, heptane-3,5-dione, octane-2,4-dione, nonane-2,4-dione, 5-methylhexane-2,4-dione, malonic acid, oxalic acid, phthalic acid, glycolic acid, salicylic acid, aminoacetic acid, ethylenediaminetetraacetate, glycol, catechol, ethylenediamine, 2,2-pipyridine, 1,10-phenanthrone, diethylenetriamine, 2-ethanolamine, dimethylglyoxime, dithizone, methionine, and salicylaldehyde. Of these, acetylacetone, ethyl acetoacetate, 2-ethanolamine are preferred.

These compounds can be used either individually or in combinations of two or more as the component (E).

The amount of the component (E) used in the composition of the present invention is 2 mols or more, preferably from 3 to 20 mols, for one mol of the organometallic compound. If the amount of the component (E) is less than 2 mols, the storage stability of the resulting composition tends to be insufficient.

Component (F)

The component (F) is particles, sol, or colloid of inorganic compounds other than the above-mentioned component (B), and has incorporated according to the properties desired for coating films.

$SiO_2$, $Al_2O_3$, $Al(OH)_3$, $Sb_2O_5$, and the like can be given as specific examples of the inorganic compounds used as the component (F).

The component (F) may be present in the form of a powder consisting of fine particles, an aqueous type sol or colloid with fine particles dispersed in water, or a solvent sol or colloid with fine particles dispersed in a polar solvent such as isopropyl alcohol or a non-polar solvent such as toluene. The solvent sol or colloid may be used by diluting with water or a solvent according to the dispersibility of the fine semiconductor particles. To improve dispersibility, a surfactant, dispersing agent, coupling agent, or the like may be added to these fine particles or sols. Alternatively, the surface of the fine particles or sols may be treated with such a surfactant, dispersing agent, or coupling agent.

When the component (F) is an aqueous sol or colloid, or solvent sol or colloid, the solid component concentration is preferably 60 wt % or less.

The above-described components can be used either individually or in combinations of two or more as the component (F).

The component (F) may be added after the preparation of the composition or may be added when the composition is being prepared. In the latter case, the component (F) is hydrolyzed or partially condensed with the component (A), component (B), and the like in the case of the first composition, or with the component (A), component (B), component (C2), and the like in the case of the second composition.

The amount of the component( F) as a solid base used in the composition the present invention is in a range usually from 0 to 500 parts by weight, and preferably from 0.1 to 400 parts by weight, for 100 parts by weight of organosilane of the component (A).

To color or adjust the thickness of the coatings, fillers may be added to and dispersed in the coating composition of the present invention.

As examples of such fillers, non-aqueous organic pigments or inorganic pigments; non-pigment ceramics in a form of particles, fibers, or scales; and metals or alloys, as well as metal oxide, hydroxide, carbide, nitride, or sulfide can be given.

Given as specific examples of these fillers are iron, copper, aluminum, nickel, silver, zinc, ferrite, carbon black, stainless steel, silicon dioxide, titanium oxide, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatomite, hydrated lime, gypsum, talc, barium carbonate, calcium carbonate, magnesium carbonate, barium sulfate, bentonite, mica, zinc green, chromium green, cobalt green, Viridian, Guinier green, cobalt chromium green, Scheele green, green soil, manganese green, pigment green, ultramarine blue pigment, iron blue pigment, pigment green, rock ultramarine blue pigment, cobalt blue, Cerulean blue, copper borate, molybdenum blue, copper sulfide, cobalt purple, Mars purple, manganese purple, pigment violet, calcium metaplumbat, zinc yellow, lead sulfide, chromium yellow, loess, cadmium yellow, strontium yellow, titanium yellow, litharge, pigment yellow, cuprous oxide, cadmium red, selenium red, chromium barmillion, Indian red, zinc white, antimony white, basic lead sulfate, white titanium pigment, lithopone, lead silicate, zircon oxide, tungsten white, lead zinc white, Bantinson white, leadphthalate, manganese white, lead sulfate, plumbago, bone black, diamond black, Thermochromic black, plant black, potassium titanate whisker, molybdenum disulfide, and the like.

The amount of these fillers used in the composition of the present invention is usually 300 parts by weight or less for 100 parts by weight of the total solid components.

In addition to the above components, known dehydrating agents such as orthomethyl formate, orthomethyl acetate, and tetraethoxysilane, as well as other additives such as surfactants, silane coupling agents, titanium coupling agents, dyes, dispersing agents, thickeners, leveling agents, and UV ray stabilizers can be added as desired to the composition of the present invention.

When the organic UV ray absorbing component (B2) is used as the component (B), a UV stabilizer (a radical capturing agent) can be jointly used to achieve more efficient UV ray absorption capabilities.

A hindered amine-type (HALS) UV stabilizer, for example, ADK STAB LA-77 manufactured by an Asahi Denka Kogyo K.K. and Sanol LS770 manufactured by Sankyo Co., Ltd. (both having a molecular weight: 480.7, melting point: 81–85° C.), Tinuvin 292 manufactured by Ciba Specialty Chemicals Co. and Sanol LS 770 manufactured by Sankyo Co., Ltd. (both being liquid and having a molecular weight of 508.8), Tinuvin 123 manufactured by Ciba Specialty Chemicals Co. (molecular weight: 737.2, liquid), Tinuvin 144 manufactured by Ciba Specialty Chemicals Co. (molecularweight: 685.0, melting point: 146–150° C.), Goof rite UV 3034 manufactured by BF Goodrich Co. (molecular weight: 338.5, melting point: 136° C.), Tinuvin 440 manufactured by Ciba Specialty Chemicals Co. and Sanol LS 440 manufactured by Sankyo Co., Ltd. (molecular weight: 435.6, melting point: 72–78 ° C.), ADK STAB LA-87 manufactured by an Asahi Denka Kogyo K.K.(molecular weight: 239.4, liquid), ADK STAB LA-52 manufactured by an Asahi Denka Kogyo K.K. (molecular weight: 847.2, melting point: 50° C. or more), ADK STAB LA-57 manufactured by an Asahi Denka Kogyo K.K. (molecular weight: 791.1, melting point: 132° C.), ADK STAB LA-62 manufactured by an Asahi Denka Kogyo K.K. (molecular weight: 900, liquid), ADK STABLA-63manufactured by an Asahi Denka Kogyo K.K. (molecular weight 900, melting point about 80–90° C.), ADK STAB LA-68 manufactured by an Asahi Denka Kogyo K.K. (molecular weight: 900, melting point: about 70–80° C.), Cyasorb UV 3346 manufactured by Cytec Co. (molecular weight: 2,000 or more, melting point: 100–130° C.), Chimassorb 944 manufactured by Ciba Specialty Chemicals Co. (molecular weight: 2,000 or more, melting point: 100–135° C.), and Tinuvin 622 manufactured by Ciba Specialty Chemicals Co. (molecular weight: 3,000 or more, melting point: 130–146° C.) can be given as UV stabilizers used in the present invention.

These UV stabilizers may be added to the composition of the present invention after the preparation or, in the case of a polymerizable UV stabilizer, may condense with the component (C2).

As a polymerizable UV stabilizer, a steric hindered amine compound or salicylic acid compound, which is a compound produced by introducing a polymerizable unsaturated group into a polymerizable UV stabilizer, can be given. Of these, a steric hindered amine compound with a polymerizable unsaturated group, particularly a piperidine compound having a polymerizable unsaturated group, is preferred.

The UV stabilizer may be added in an amount usually 15 parts by weight or less, and preferably 10 parts by weight or less, for 100 parts by weight of total solid components of the composition of the present invention.

There are no specific limitations to the method of blending the components for preparing the first composition, when the composition does not contain an organometallic compound and the like in the component (D) and the component (E). When the component (E) or an organometallic compound and the like is used, a mixture excluding the component (E) among the components (A) to (E) is first prepared and then the component (E) is added. Specifically, the following process ① or ② is applicable.

① A process comprising preparing a mixture of an organosilane compound of the component (A), the component (B), and a required amount of an organic solvent and the component (D), adding a prescribed amount of water to effect the hydrolysis-partial condensation reaction, and adding the component (E).

② A process comprising preparing a mixture of an organosilane compound of the component (A), the component (B), and a required amount of an organic solvent, adding a prescribed amount of water to effect the hydrolysis-partial condensation reaction, adding the component (D) to effect a further partial condensation reaction, and adding the component (E).

The following process ③ can be applied optionally to the preparation of the first composition.

③ A process comprising implementing the above process ① or ② using the components other than the component (B), followed by the addition of the component (B).

In addition, the components other than the components (A) to (E) can be added at any optional step during the preparation of the first composition.

There are no specific limitations to the method of blending the components for preparing the second composition, when the composition does not contain an organometallic compound and the like in the component (D) and the component (E). When the component (E) or an organometallic compound is used, a mixture excluding the component (E) among the components (A) to (E) is first prepared and then the component (E) is added. Specifically, the following process ④ to ⑥ is applicable.

④ A process comprising preparing a mixture of an organosilane compound of the component (A), component (B), component (C2), component (D), and a required amount of an organic solvent, adding a prescribed amount of water to effect the hydrolysis-partial condensation reaction, and adding the component (E).

⑤ A process comprising preparing a mixture of an organosilane compound of the component (A), the component (B), and a required amount of an organic solvent, adding a prescribed amount of water to the mixture to effect the hydrolysis-partial condensation reaction, adding the component (C2) and component (D) to effect a further partial condensation reaction, and then adding the component (E).

⑥ A process comprising preparing a mixture of an organosilane compound of the component (A), component (B), component (D), and a required amount of an organic solvent, adding a prescribed amount of water to effect the hydrolysis-partial condensation reaction, adding the component (C2) to effect a further partial condensation reaction, and then adding the component (E).

The following process ⑦ can be optionally applied to the preparation of the second composition.

⑦ A process comprising implementing the above process ④, ⑤ or ⑥ using the components other than the component (B), followed by the addition of the component (B).

In addition, the components other than the components (A) to (E) can be added at any optional step during the preparation of the second composition.

To apply the composition of the present invention onto a substrate, a brush, role coater, flow coater, centrifugal coater, supersonic wave coater, or the like can be used, or a coating method such as dipping, running, spraying, screening, electrodeposition, or vacuum evaporation, can be used, to produce coatings with a thickness from 1 to 40 μm by one application or a thickness from 2 to 80 μm by application two or three times. Then, the coatings are dried at atmospheric temperature or with heating at about 30–200° C. for about 10 to 60 minutes, thereby obtaining coatings on various substrates.

Here, given as examples of a substrate to which the composition of the present invention can be applied are metals such as iron, aluminum, and stainless steel; inorganic ceramic materials such as cement, concrete, ALC, flexible boards, mortar, slates, gypsum, ceramics, and bricks; formed plastics such as phenol resin, epoxy resin, polyester, polycarbonate, polyethylene, polypropylene, and ABS resin (acrylonitrile-butadiene-styrene resin); plastic films such as polyethylene, polypropylene, polyvinyl alcohol, polycarbonate, polyethylene terephthalate, polyurethane, and polyimide; and wood, paper, glass and the like. The composition of the present invention is useful for re-coating of deteriorated coatings.

The surface of these substrates may be previously treated to adjust the base, improve adhesion, fill pores in porous substrates, provide smoothness, or produce patterns.

As a surface treatment for metal substrates, grinding, degreasing, galvanizing, chromate treatment, flame treatment, coupling, and the like can be given. As examples of a surface treatment for plastic substrates, blast treatment, chemical treatment, degreasing, flame treatment, oxidation treatment, steaming, corona discharge, UV irradiation, plasma treatment, ion treatment, and the like can be given. As examples of surface treatment for inorganic ceramic substrates, grinding, filling, pattern production, and the like can be given. As a surface treatment for wooden substrates, grinding, filling, moth proofing, and the like can be given. Filling, moth proofing, and the like can be given as examples of a surface treatment for paper substrates. A surface preparation and the like can be given as examples of a surface treatment for deteriorated coatings.

The coating operation using the composition of the present invention differs according to the type and conditions of substrates and the method of application. For example, in the case of a metal substrate, a primer is used if rust prevention is necessary. In the case of an inorganic ceramic substrate, a primer is usually used because each substrate has individual masking properties of coatings according to its characteristics (surface roughness, impregnation, alkalinity, and the like). A primer is also used for re-coating of significantly deteriorated coatings.

In the case of other substrates such as plastics, woods, papers, and glasses, a primer may be used or may not be used according to application. When the second composition does not contain a primer, it is desirable that the component (C2) comprises 0.5 wt % or more of at least one of carboxyl group, acid anhydride group, hydroxyl group, carbonyl group, or glycidyl group, or more preferably the above-described surface treatment is carried out before the primer treatment.

There are no specific limitations to the kind of a primer used as long as the primer can increase adhesion of the composition of the present invention to substrates. A specific primer is selected from various types according to the kind of substrates and the objectives of application. The primers can be used either individually or in combinations of two or more.

The primer may be either an enamel paint containing a color component such as a pigment or a clear pigment which does not contain a color component.

Given as specific examples a primer are an alkyd resin, aminoalkyd resin, epoxy resin, polyester resin, acrylic resin, urethane resin, fluoro resin, acrylic silicone resin, acrylic emulsion, epoxy emulsion, polyurethane emulsion, polyester emulsion, silicone-acrylic resin emulsion, fluoro resin emulsion, and the like. These primers may be provided with a various kind of functional group when adhesion of coatings to substrates under severe conditions is desired. As examples of such a functional group, a hydroxyl group, carboxyl group, carbonyl group, amide group, amine group, glycidyl group, alkoxysilyl group, ether bond, ester bond, and the like can be given.

Moreover, to increase abrasion resistance and glossiness of coating films a clear layer of a siloxane resin-based paint which is a stable solution consisting of colloidal silica and a siloxane resin (described in U.S. Pat. No. 3,986,997 or U.S. Pat. No. 4,027,073, for example) can be formed over the surface of the coating film which was formed from the composition of the present invention.

The following application forms of the composition of the present on substrates can be given by way of example.
(a) Substrate/coating composition (clear)
(b) Substrate/coating layer of other paint/coating composition (clear)

Here, "clear" indicates a composition not containing a coloring component, whereas an "enamel" indicates a composition containing a coloring component. As the coating layer of other paint in (b) above, layers of an organic paint and printing ink can be given. In addition, a primer layer mentioned above can be previously formed on the substrate in the above forms (a) and (b) as required.

As described above, the coating composition of the present invention has superior storage stability and produces coatings with excellent appearance, adhesion, weather resistance, high hardness, and superb UV absorbing capability. The coating composition can prevent deterioration of substrates and bases. The composition thus exhibits an extremely high property balance as an organosilane-based coating material.

The present invention will be explained in more detail by way of examples, which are not intended to be limiting of the present invention.

EXAMPLES

In the examples hereinafter unless otherwise designated, "parts" and "%" respectively indicate "parts by weight" and "% by weight".

Various properties in the examples and comparative examples were measured and evaluated according to the following methods.
Mw/Mn
Mw and Mn were measured by gel permeation chromatography (GPC) under the following conditions:
Samples: Sample solutions were prepared using tetrahydrofuran as a solvent. Specifically, 1 g of organosilane partial condensate or 0.1 g of silyl group-containing vinyl resin was dissolved in 100 cc of tetrahydrofuran.
Standard polystyrene: The standard polystyrene manufactured by Pressure Chemical Co. of the US was used.
Apparatus: High temperature high speed gel permeation chromatogram manufactured by Waters Co. of the US (model 150-C ALC/GPC) was used.
Column: SHODEX A-80M (length 50 cm) manufactured by Showa Denko Co., Ltd. was used. Measurement temperature: 40° C. Flow rate: 1 cc/minute
Storage Stability
The composition which does not contain a curing accelerator was stored at ordinary temperatures for 3 months in a tightly sealed polyethylene bottle to inspect presence or absence of gel by naked eye observation. Viscosity of samples without gel formation was measured using a BM-type viscosimeter manufactured by Tokyo Keiki Co., Ltd. The samples of which the viscosity change was within 20% was judged as "Not changed (○)", whereas the samples of which the viscosity change more than 20% was judged as "Changed (X)".
Hardness
Pencil hardness was measured according to JIS K5400.
UV Ray Absorptivity
A transmittance curve at a wavelength of 30 nm or less was measured using Hitachi self-recording spectrophotometer.
  ⊚: UV ray absorptivity was more than 90%
  ○: UV ray absorptivity was 80% to 90%
  Δ: UV ray absorptivity was 50% to 80%
  X: UV ray absorptivity was less than 50%
Transparency (visible light transmittance)
The composition was applied on a silica glass plate to a dry film thickness of 10 μm to measure visible light transmittance. The evaluation results were classified according to the following standard.
  ⊚: Transmittance was more than 90%
  ○: Transmittance was 80% to 90%
  Δ: Transmittance was 70% to 80%
  X: Transmittance was less than 70%
Adhesion
The adhesion was evaluated by the tape peeling test according to the cross-cut test (100 cross-cut squares) of the JIS K5400. The test was carried out three times for each test specimen and the average was applied to the evaluation according to the following standard.
  ○: No cross-cut squares peeled off.
  Δ: Cross-cut squares remained unpeeled was 80 or more and less than 100.
  X: Cross-cut squares remained unpeeled was less than 80.
Tensile Characteristics (elongation)
A change in elongation was measured by a tensile test using an autograph and a load cell of 100 kg.
Weather Resistance
The adhesion and elongation of coatings were evaluated in accordance with the above-described methods mention after the weather resistance test by irradiation for 3,000 hours using a sunshine weather meter according to JIS K5400.

Example 1

100 parts of methyltrimethoxysilane (MTMS), 20 parts of silicone resin (polymethylhydroxysilylsesqioxane, Mw=10,000), 75 part of silica sol, 15 parts of aluminum di-i-propoxyethylacetoacetate, 50 parts of a dispersion of ZnO in toluene (ZnO: 30%, toluene: 70%), 125 parts of i-propyl alcohol (IPA), and 20 parts of ion exchange water were added to a reactor equipped with a reflux condenser and a stirrer. After the reaction for 4 hours at 60° C., 15 parts of acetylacetone was added and the mixture was cooled to the room temperature, to obtain the composition (I-a) with a solid concentration of 20%.

Next, 20 parts of a 20% solution of dibutyltin dimaleate in IPA was added to 100 parts of the composition (I-a) and the mixture was stirred. The mixture was applied onto a silica glass plate using a bar coater, heated and dried for 10 minute at 100° C., to obtain test specimens for the hardness test, UV ray absorptivity test, and transparency test. The results of storage stability evaluation of the composition and the other evaluation results using the test specimens are shown in Table 1.

Example 2–8

The compositions (I-b) to (I-h) with a solid concentration of 20% and the test specimens were prepared in the same manner as in Example 1, except that the components shown in Table 1 were used according to the formulation shown in Table 1. The results of storage stability evaluation of the composition and the other evaluation results using the test specimens are shown in Table 1.

Example 9

100 parts of methyltrimethoxysilane, 75 parts of a silica sol solution (silica 30%), and 125 parts of i-propyl alcohol were added to a reactor equipped with a reflux condenser and a stirrer. 15 parts of aluminum di-i-propoxyethyl acetoacetate and 20 parts of ion exchange water were added to the mixture. The resulting mixture was reacted for 4 hours at 60° C. while stirring. After the addition of 15 parts of acetylacetone, the mixture was cooled to the room temperature. Then, 50 parts of a dispersion of ZnO in i-propyl alcohol (ZnO: 30%, i-propyl alcohol: 70%), 20 parts of 3-aminopropyltrimethoxysilane, and 20 parts of dibutyltin dimaleate were added to obtain 20 parts of the composition (I-i) with a solid concentration of 20%. Test specimens were prepared in the same manner as in Example 1, except for using the composition (I-i) instead of the composition (I-a). The results of storage stability evaluation of the composition (I-i) and the other evaluation results using the test specimens are shown in Table 1.

The compositions in the following table, all contain 20 parts of silicone resin, as so set forth in Example 1, above.

TABLE 1

| Example<br>Composition | 1<br>I-a | 2<br>I-b | 3<br>I-c | 4<br>I-d | 5<br>I-e | 6<br>I-f | 7<br>I-g | 8<br>I-h | 9<br>I-i |
|---|---|---|---|---|---|---|---|---|---|
| Components (Parts) | | | | | | | | | |
| MTMS (Methyltrimethoxysilane) | 100 | — | 80 | 100 | 100 | 100 | 100 | 100 | 100 |
| TEOS (Tetraethoxysilane) | — | 100 | — | — | — | — | — | — | — |
| DMDMS (Dimethyldimethoxysilane) | — | — | 20 | — | — | — | — | — | — |
| Aluminum di-i-propoxyethylacetoacetate | 15 | 15 | 15 | 15 | 15 | 15 | 15 | 15 | 15 |
| Ion exchange water | 20 | — | 20 | 20 | 20 | 20 | 20 | 20 | 20 |
| IPA | 125 | 125 | 125 | — | — | — | — | 125 | — |
| Silica sol | 75 | — | — | 75 | 75 | 75 | 75 | — | 75 |
| Acetyl acetone | 15 | 15 | 15 | 15 | 15 | 15 | 15 | 15 | 15 |
| ZnO/toluene | 50 | 30 | 30 | — | — | — | 10 | — | 105 |
| ZnO/IPA | — | — | — | — | 15 | 15 | — | 15 | 50 |
| TiO$_2$/IPA | — | — | — | 50 | — | — | — | — | — |
| CeO$_2$/IPA | — | — | — | — | 15 | — | — | — | — |
| Organic UV absorber A | — | — | — | — | — | 4.5 | — | — | — |
| UV stabilizer A | — | — | — | — | — | — | — | 4.5 | — |
| Evaluation results | | | | | | | | | |
| Storage stability | ○ | ○ | ○ | ○ | ○ | ○ | ○ | ○ | ○ |
| Hardness | 3H | 2H | 2H | 3H | 3H | 3H | 3H | 3H | 4H |
| UV absorption rate | ⊙ | ⊙ | ⊙ | ⊙ | ⊙ | ⊙ | ⊙ | ⊙ | ⊙ |
| Visible ray transmission rate | ○ | ○ | ○ | ○ | ○ | ○ | ○ | ○ | |

Organic UV absorber A: 2-Hydoxyphenyl benzotriazine
UV stabilizer A: Chimassorb 944LD manufactured by Ciba Specialty Chemicals Co.

TABLE 2

| Comparative Example | 1 | 2 | 3 |
|---|---|---|---|
| Composition | i-a | i-b | i-c |
| Component (Part) | | | |
| MTMS | 100 | 100 | 100 |
| Silica sol | 75 | 75 | 75 |
| ZnO/IPA | — | 550 | 0.05 |
| 3-Aminopropyltrimethoxysilane (Component(D)) | 20 | 20 | 20 |
| Evaluation results | | | |
| Storage stability | ○ | X | ○ |
| Hardness | 2H | 4H | 2H |
| UV absorption rate | X | ⊙ | Δ |
| Visible ray transmission rate | ⊙ | X | ⊙ |

Reference Example 1
<Preparation of the component (C2)>

A reactor equipped with a reflux condenser and stirrer was charged with 70 parts of methyl methacrylate, 20 parts of cyclohexylmethacrylate, 40 parts of n-butyl acrylate, 20 parts of 3-methacryloxypropyl trimethoxysilane, 10 parts of 4-methacryloyloxy piperidine (ADK STAB LA-87 manufactured by an Asahi Denka Kogyo K.K.), 100 parts of i-propyl alcohol, and 60 parts of methyl ethyl ketone. The mixture was heated at 80° C. with stirring and a solution of Comparative Examples 1–3

The compositions (i-a) to (i-c) with a solid concentration of 20% and the test specimens were prepared in the same manner as in Example 1, provided that the components shown in Table 2 were used according to the formulation shown in Table 2, and provided further that component (D) was added after the reaction mixture was cooled to room temperature. The results of storage stability evaluation of the composition and the other evaluation results using the test specimens are shown in Table 2.

4 parts of azobisisovalelonitrile dissolved in 10 parts of xylene was added dropwise over 30 minutes. After the addition, the mixture was reacted for a further 5 hours at 80° C. to obtain a solution of the component (C2) A with a solid concentration of 50%. The resulting component (C2) A contained 6 silyl groups per one polymer molecule in average and had an Mn of 12,000.

Reference Example 2
<Preparation of the component (C2)>

A reactor equipped with a reflux condenser and stirrer was charged with 40 parts of methyl methacrylate, 50 parts of a copolymer of 2-hydroxy-4-(methacryloyloxyethoxy) benzophenone and methyl methacrylate, 40 parts of 2-ethylhexylacrylate, 20 parts of 3-methacryloyloxypropyl trimethoxysilane, 10 parts of 4-methacryloyloxy-N-methylpiperidine (ADK STAB LA-82 manufactured by an Asahi Denka Kogyo K.K.), 100 parts of i-propyl alcohol, and 60 parts of methyl ethyl ketone. The mixture was heated at 80° C. with stirring and a solution of 4 parts of azobisisovalelonitrile dissolved in 10 parts of xylene was added dropwise over 307 minutes. After the addition, the mixture was reacted for a further 5 hours at 80° C. to obtain a solution of the component (C2) B with a solid concentration of 50%. The resulting component (C2) B contained 6 silyl groups per one polymer molecule in average and had an Mn of 12,000.

Example 10

A reactor equipped with a reflux condenser and stirrer was charged with 100 parts of methyltrimethoxysilane (MTMS), 50 parts of dimethyldimethoxysilane (DMDMS), 50 parts of a dispersion of ZnO in i-propyl alcohol (ZnO: 30%, i-propyl alcohol: 70%), 100 parts of component (C2) A (solid concentration 50%) prepared in Reference Example 1, 20 parts of aluminum di-i-propoxy-ethylacetoacetate, and 100 parts of i-propyl alcohol. The mixture was reacted for 4 hours at 60° C. with stirring. 30 parts of acetylacetone was added to obtain a composition (II-a) with a solid concentration of 30%.

Next, 20 parts of a 20% solution of zirconium tri-n-butoxyethyl acetoacetate in IPA was added to 100 parts of the composition (II-a) and the mixture was stirred. The resulting mixture was applied onto a silica glass plate using a bar coater, heated and dried for 10 minute at 100° C., to obtain test specimens for the hardness test, UV ray absorptivity test, and transparency test. The results of storage stability evaluation of the composition (II-a) and the other evaluation results using the test specimens are shown in Table 3.

Examples 11–22

The compositions (II-b) to (II-m) with a solid concentration of 30% and the test specimens were prepared in the same manner as in Example 10, except that the components and formulations shown in Tables 3–4 were used. In addition, the aqueous-type sol of titanium oxide in Example 16 consisted of 30% of titanium oxide, 20% of water, and 50% of i-propyl alcohol, and the aqueous-type sol of cerium oxide in Example 17 consisted of 30% of cerium oxide and 70% of i-propyl alcohol.

The results of storage stability evaluation of the compositions and the other evaluation results using the test specimens are shown in Tables 3 and 4.

Example 23

A reactor equipped with a reflux condenser and stirrer was charged with 100 parts of methyltrimethoxysilane (MTMS), 50 parts of dimethyldimethoxysilane (DMDMS), 100 parts of the component (C2) A (solid concentration: 50%) prepared in Reference Example 1, 20 parts of aluminum di-i-propoxyethyl acetate, and 100 parts of i-propyl alcohol. Then, 30 parts of ion exchange water was added, followed by reaction for 4 hours at 60° C. while stirring. After cooling to room temperature, 50 parts of a solvent-type sol ZnO (ZnO: 30%, i-propyl alcohol: 70%) and 20 parts of zirconium tri-n-butoxyethylacetoacetate were added to obtain the composition (II-n) with a solid concentration of 30%. Test specimens were prepared from the composition (II-n) and evaluated in the same manner as in Example 10.

The results of storage stability evaluation of the compositions and the other evaluation results using the test specimens are shown in Table 4.

TABLE 3

| Example<br>Composition | 10<br>II-a | 11<br>II-b | 12<br>II-c | 13<br>II-d | 14<br>II-e | 15<br>II-f |
|---|---|---|---|---|---|---|
| Component (Parts) | | | | | | |
| MTMS | 100 | — | 100 | 100 | 100 | 100 |
| TEOS | — | 100 | — | — | — | — |
| DMDMS | 50 | 50 | 50 | 50 | 50 | 50 |
| Component (C2) A | 100 | 100 | 800 | — | 100 | — |
| component (C2) B | — | — | — | — | — | 100 |
| Epoxy polymer with a silyl group | — | — | — | 100 | — | — |
| Aluminum di-i-propoxyethyl acetoacetate | 20 | 20 | 20 | 20 | 20 | 20 |
| Ion exchanged water | 30 | 30 | 30 | 30 | 30 | 30 |
| Acetyl acetone | 30 | — | — | 15 | — | — |
| Ethyl acetoacetate | — | — | — | 15 | — | — |
| 2-Ethanolamine | — | — | 40 | — | — | — |
| i-Propyl alcohol | 100 | 100 | 560 | 100 | — | 100 |
| ZnO/IPA | 50 | 50 | 150 | 50 | 200 | 50 |
| TiO$_2$/IPA | — | — | — | — | — | — |
| CeO$_2$/IPA | — | — | — | — | — | — |
| Evaluation results | | | | | | |
| Storage stability | ○ | ○ | ○ | ○ | ○ | ○ |
| Hardness | 2H | 2H | 2H | 2H | 3H | 2H |
| UV absorption rate | ⊚ | ⊚ | ⊚ | ⊚ | ⊚ | ⊚ |
| Visible ray transmission rate | ⊚ | ⊚ | ⊚ | ⊚ | ○ | ⊚ |

TABLE 4

| Example<br>Composition | 16<br>II-g | 17<br>II-h | 18<br>II-i | 19<br>II-j | 20<br>II-k | 21<br>II-l | 22<br>II-m | 23<br>II-n |
|---|---|---|---|---|---|---|---|---|
| Component (Parts) | | | | | | | | |
| MTMS | 100 | 100 | 100 | 100 | 100 | 100 | 100 | 100 |
| TEOS | — | — | — | — | — | — | — | — |
| DMDMS | 50 | 50 | 50 | 50 | 50 | 50 | 50 | 50 |
| Component (C2) A | 100 | 100 | 100 | 100 | 100 | 100 | 100 | 100 |
| component (C2) B | — | — | — | — | — | — | — | — |
| Epoxy polymer with a silyl group | — | — | — | — | — | — | — | — |
| Aluminum di-i-propoxyethyl acetoacetate | 20 | 20 | 20 | 20 | 20 | 20 | 20 | 20 |
| Ion exchanged water | 30 | 30 | 30 | 30 | 30 | 30 | 30 | 30 |
| Acetyl acetone | — | — | — | — | — | — | — | — |
| Ethyl acetoacetate | — | — | — | — | — | — | — | — |
| 2-Ethanolamine | — | — | — | — | — | — | — | — |
| i-Propyl alcohol | 100 | 50 | 100 | 100 | 100 | 100 | 100 | 100 |
| ZnO/IPA | 10 | — | 25 | 25 | 25 | 50 | 50 | 50 |
| TiO$_2$/IPA | — | 50 | — | — | — | — | — | — |
| CeO$_2$/IPA | — | — | 25 | — | — | — | — | — |
| Organic UV absorber B | — | 50 | — | 5 | — | — | — | — |
| Organic UV absorber C | — | — | — | — | 5 | — | — | — |
| UV stabilizer B | — | — | — | — | — | 5 | — | — |
| UV stabilizer C | — | — | — | — | — | — | 5 | — |
| Zirconium tri-n-butoxyethyl acetoacetate | — | 20 | 20 | — | — | — | — | 20 |
| <Component

TABLE 4-continued

| Example | 16 | 17 | 18 | 19 | 20 | 21 | 22 | 23 |
|---|---|---|---|---|---|---|---|---|
| Composition | II-g | II-h | II-i | II-j | II-k | II-l | II-m | II-n |
| (D)> | | | | | | | | |
| Dioctyltin dimaleate | — | — | — | 50 | 50 | 50 | 50 | — |
| <Component (D)> | | | | | | | | |
| Evaluation results | | | | | | | | |
| Storage stability | ○ | ○ | ○ | ○ | ○ | ○ | ○ | ○ |
| Hardness | 2H | 2H | 2H | 2H | 2H | 2H | 2H | 2H |
| UV absorption rate | | | | | | | | |
| Visible ray transmission rate | | | | | | | | |

Organic UV absorber B: 2-(5-Octapropionate-2-hydroxy-3-butoxyphenyl)-2H-benzotriaole
Organic UV absorber C: 2,2',4,4'-Tetrahydroxybenzophenone
UV stabilizer B: Bis(2,2',6,6'-tetramethyl-4-piperidyl) sebacate
UV stabilizer C: Hindered amine-type, Chimassorb 944LD manufactured by Ciba Specialty Chemicals Co.

Comparative Example 4–6

The compositions (ii-a) to (ii-c) with a solid concentration of 30% and the test specimens were prepared in the same manner as in Example 9, provided that the components and formulations shown in Table 5 were used and reacted under the reaction conditions shown in Table 5. The results of storage stability evaluation of the composition and the other evaluations result using the test specimens are shown in Table 5.

TABLE 5

| Example | 4 | 5 | 6 |
|---|---|---|---|
| Composition | ii-a | ii-b | ii-c |
| Component (Parts) | | | |
| MTMS | 100 | 100 | 100 |
| TEOS | — | — | — |
| DMDMS | 50 | 50 | 50 |
| C2 | 100 | 100 | 100 |
| Epoxy polymer with a silyl group | — | — | — |
| Aluminum di-i-propoxyethyl acetoacetate | 20 | 20 | 20 |
| Ion exchanged water | 30 | 30 | 30 |
| Acetyl acetone | 30 | 30 | 30 |
| Ethyl acetoacetate | — | — | — |
| 2-Ethanolamine | — | — | — |
| i-Propyl alcohol | 100 | — | 100 |
| ZnO/IPA | — | 350 | 0.1 |
| $TiO_2$/IPA | — | — | — |
| $CeO_2$/IPA | — | — | — |
| Zirconium tri-n-butoxyethylacetoacetate | 50 | 50 | 50 |
| Dioctyltin dimaleate | — | — | — |
| Evaluation results | | | |
| Storage stability | ○ | X | ○ |
| Hardness | 2H | 3H | 2H |
| UV absorption rate | X | ◉ | △ |
| Visible ray transmission rate | ◉ | △ (Cracked) | ◉ |

Reference Example 3 (Preparation of primer)

Primers were prepared to ensure long-term adhesion to substrates. The primers may be used either as is or, when the primer is directly exposed to light, after provided with UV absorptivity in the same manner as in the composition of the present invention to increase long-term weather resistance. For this reason, a composition comprising 100 parts of a solid alkyd resin, for example, and 10 parts of a dispersion of ZnO in toluene (ZnO concentration 30%) was used as a primer. The same formulation was used for other solvent-type resins. Compositions comprising 100 parts of a solid resin and a dispersion of ZnO in water (ZnO concentration 30%) were used as emulsion-type primers. An acrylic copolymer-type UV absorber (UVA-635L, manufactured by BASF) was added in an amount of 15% to acryl resin or acryl-silicone resin primers.

Test Example

An inorganic ceramic substrate, foaming concrete, metal (SUS), plastic, glass, ETFE film, and wood, each coated with the composition of the present invention, either previously treated or not treated with the primers prepared in the Reference Example 3, were subjected to weather resistance evaluation.

Specifically, the above-mentioned various substrates were coated with the composition (I-a) prepared in Example 1 or the composition (I-b) prepared in Example 2 according to the same method and conditions as in Example 1, to evaluate adhesion and weather resistance in terms of elongation. The results are shown in Table 6.

Comparison Test Example

The above-mentioned substrates, either previously treated or not treated with the primers prepared in the Reference Example 3, were coated with the composition (i-a) prepared in Comparative Example 1 according to the same method and conditions as in Example 1, to evaluate adhesion and weather resistance in terms of elongation. The results are shown in Table 7.

TABLE 7

| | Composition | | | |
|---|---|---|---|---|
| | I-a | I-b | I-a | I-b |
| | Evaluation items | | | |
| | Adhesion | | Elongation | |
| Substrate/Primer | Initial | After weather resistance evaluation | Initial | After weather resistance evaluation | After weather resistance evaluation | After weather resistance evaluation |
| Inorganic ceramic 12 mm/Acryl-silicone | ○ | ○ | ○ | ○ | — |
| Inorganic ceramic 12 mm/Epoxy resin (ZnO 10%) | ○ | ○ | ○ | ○ | — |
| Inorganic ceramic 12 mm/Acryl-silicone emulsion ($TiO_2$ 10%) | ○ | ○ | ○ | ○ | — |
| Acryl-silicone 12 mm/Alkyd resin (ZnO 10%) | ○ | ○ | ○ | ○ | — |
| Foaming concrete/Epoxy resin (10%) | ○ | ○ | ○ | ○ | — |
| SUS (JIS G4305)/Epoxy resin | ○ | ○ | ○ | ○ | — |

TABLE 7-continued

| Substrate/Primer | Composition | | | | | |
|---|---|---|---|---|---|---|
| | I-a | I-b | I-a | I-b | | |
| | Evaluation items | | | | | |
| | Adhesion | | | Elongation | | |
| | Initial | After weather resistance evaluation | Initial | After weather resistance evaluation | After weather resistance evaluation | After weather resistance evaluation |
| Plastic (ABS)/None | ○ | ○ | ○ | ○ | — | — |
| Plastic (PET)/Acryl Sgsilicone (UVA-635L Copolymer) | ○ | ○ | ○ | ○ | No change | No change |
| Silicone (PEN)/UVA-635L added and dispersed | ○ | ○ | ○ | ○ | No change | No change |
| Glass/None | ○ | ○ | ○ | ○ | — | — |
| ETFE/Fluoro resin | ○ | ○ | ○ | ○ | No change | No change |
| Wood/Polyester-silicone resin (ZnO 10%) | | | | | — | — |

TABLE 8

| Evaluation items Substrate/Primer | Composition | | |
|---|---|---|---|
| | i-a Adhesion | | i-a |
| | Initial | After weather resistance evaluation | After weather resistance evaluation |
| Plastic(ABS)/None | ○ | Peeled | — |
| Plastic(PET)/Acryl-silicone(UVA-635L Copolymer) | ○ | PET deteriorated | 200 hrs.0% |
| Plastic(PEN)/Acryl-silicone (UVA-635L) | ○ | PEN deteriorated | 200 hrs.0% |
| Wood/Polyester/silicone resin (ZnO 10%) | ○ | Peeled | — |

As described above, the coating composition of the present invention has superior storage stability and produces coatings with excellent appearance, adhesion, weather resistance, high hardness, and superb UV absorbing capability. The coating composition can prevent deterioration of substrates and bases. The composition thus exhibits an extremely high property balance as an organosilane-based coating material.

Obviously, numerous modifications and variations of the present invention are possible in light of the above teachings. It is therefore to be understood that, within the scope of the appended claims, the invention may be practiced otherwise than as specifically described herein.

What is claimed is:

1. A coating composition which comprises:
(A) a hydrolyzate or partial condensate, or both, of an organosilane compound represented by the following formula (1), $$(R^1)_n Si(OR^2)_{4-n} \qquad (1)$$

wherein $R^1$ is a hydrogen atom or a monovalent organic group having 1–8 carbon atoms, $R^2$ is an alkyl group having 1–5 carbon atoms or an acyl group having 1–6 carbon atoms, and n is an integer from 0 to 2, (B) from 0.5 to 200 parts by weight, for 100 parts by weight of component (A), of at least one ultraviolet ray absorbing component selected from the group consisting of fine semiconductor particles, semiconductor sols, and organic compounds having ultraviolet ray absorbing capability, and (C1) water or an organic solvent, or both.

2. The coating composition according to claim 1, further comprising:
(D) at least one curing accelerator selected from the group consisting of acid compounds, alkaline compounds, salt compounds, amine compounds, organometallic compounds, and partial hydrolyzates of the organometallic compounds.

3. The coating composition according to claim 2, wherein the component (D) is an organometallic compound of the following formula (2), $$M(OR^{10})_p (R^{11}COCHCOR^{12})_q \qquad (2)$$

wherein M is zirconium, titanium, or aluminum, $R^{10}$ and $R^{11}$ individually represent a monovalent hydrocarbon group having 1–6 carbon atoms, such as an ethyl group, n-propyl group, i-propyl group, n-butyl group, sec-butyl group, t-butyl group, n-pentyl group, n-hexyl group, cyclohexyl group, or phenyl group, $R^{12}$ represents, in addition to the monovalent hydrocarbon groups having 1–6 carbon atoms defined for $R^{10}$ and $R^{11}$, an alkoxyl group having 1–16 carbon atoms such as a methoxy group, ethoxy group, n-propoxy group, i-propoxy group, n-butoxy group, sec-butoxy group, t-butoxy group, lauryloxy group, or stearyloxy group, and p and q are individually integers from 0 to 4, with (p+q) being a valence of M, and further comprising, (E) at least one compound selected from the group consisting of β-diketone compounds of the following formula (3), $$R^{13}COCH_2COR^{14} \qquad (3)$$

wherein $R^{13}$ and $R^{14}$ are the same as $R^{11}$ and $R^{12}$ defined for the above formula (2), β-keto esters, carboxylic acid compounds, dihydroxy compounds, amine compounds, and oxyaldehyde compounds.

4. A coating composition which comprises:
(A) a hydrolyzate or partial condensate, or both, of an organosilane compound represented by the following formula (1), $$(R^1)_n Si(OR^2)_{4-n} \qquad (1)$$

wherein $R^1$ is a hydrogen atom or a monovalent organic group having 1–8 carbon atoms, $R^2$ is an alkyl group having 1–5 carbon atoms or an acyl group having 1–6 carbon atoms, and n is an integer from 0 to 2, (b) from 0.5 to 200 parts by weight, for 100 parts by weight of component (A), of at least one ultraviolet ray absorbing component selected from the group consisting of semiconductor fine particles, semiconductor sols, and organic compounds having ultraviolet ray absorbing capabilities, and (C2) a polymer having a silyl group of which the silicon atom is bonded with a hydrolyzable group and/or a hydroxyl group on the terminal and/or side chain of the polymer molecule.

5. The coating composition according to claim 4, further comprising:
    (D) at least one curing accelerator selected from the group consisting of acid compounds, alkaline compounds, salt compounds, amine compounds, organometallic compounds, and partial hydrolyzates of the organometallic compounds.

6. The coating composition according to claim 5, wherein the component (D) is an organometallic compound of the following formula (2), $$M(OR^{10})_p(R^{11}COCHCOR^{12})_q \qquad (2)$$

wherein M is zirconium, titanium, or aluminum, $R^{10}$ and $R^{11}$ individually represent a monovalent hydrocarbon group having 1–6 carbon atoms, such as ethyl group, n-propyl group, i-propyl group, n-butyl group, sec-butyl group, t-butyl group, n-pentyl group, n-hexyl group, cyclohexyl group, or phenyl group, $R^{12}$ represents, in addition to the monovalent hydrocarbon groups having 1–6 carbon atoms defined for $R^{10}$ and $R^{11}$, an alkoxyl group having 1–16 carbon atoms such as methoxy group, ethoxy group, n-propoxy group, i-propoxy group, n-butoxy group, sec-butoxy group, t-butoxy group, lauryloxy group, or stearyloxy group, and p and q are individually an integer of 0–4, with (p+q) being the valence of M, and further comprising,
    (E) at least one compound selected from the group consisting of β-diketone compounds of the following formula (3), $$R^{13}COCH_2COR^{14} \qquad (3)$$

wherein $R^{13}$ and $R^{14}$ are the same as $R^{11}$ and $R^{12}$ defined for the above formula (2), β-keto esters, carboxylic acid compounds, dihydroxy compounds, amine compounds, and oxyaldehyde compounds.

7. The coating composition according to claim 4, wherein the ultraviolet ray absorbing component (B) is an organic compound having ultraviolet absorbing capability and forms a condensate with the polymer of the component (C2).

8. A cured product produced by applying the coating composition of claim 1 or claim 4 onto a substrate and drying the coating.

9. A cured product produced by applying a primer on a substrate, applying the coating composition of claim 1 or claim 4 on the primer, and drying the coating.

* * * * *